United States Patent
Brun et al.

(10) Patent No.: US 6,325,920 B1
(45) Date of Patent: Dec. 4, 2001

(54) PROCESS FOR SULPHURIZATION OF HYDROTREATING CATALYSTS

(75) Inventors: Claude Brun, Idron; Thierry Cholley, Lyons; Geoges Fremy, Sauveterre de Bearn, all of (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/553,409

(22) Filed: Apr. 20, 2000

(30) Foreign Application Priority Data

Apr. 20, 1999 (FR) .................................................. 99.04967

(51) Int. Cl.$^7$ .......................... C10G 45/04; C10G 17/00; B01J 31/00; B01J 27/047; B01J 23/00
(52) U.S. Cl. .................... 208/216 R; 208/209; 208/213; 208/217; 208/254 R; 208/254 H; 502/168; 502/172; 502/219; 502/220; 502/221; 502/222; 502/314; 502/315
(58) Field of Search .................... 502/168, 172, 502/219–222, 314, 315; 208/209, 213, 216 R, 217, 254 R, 254 H

(56) References Cited

U.S. PATENT DOCUMENTS

| | | | |
|---|---|---|---|
| 3,016,347 | 1/1962 | O'Hara | 208/216 |
| 3,140,994 | 7/1964 | Derr, Jr. et al. | 208/254 |
| 3,732,155 | 5/1973 | Cecil et al. | 208/210 |
| 3,891,680 * | 6/1975 | Katsumoto et al. | 549/262 |
| 4,098,682 | 7/1978 | O'Hara | 208/216 |
| 4,132,632 | 1/1979 | Yu et al. | 208/216 |
| 4,172,027 | 10/1979 | Ham et al. | 208/140 |
| 4,176,087 | 11/1979 | Dew et al. | 252/439 |
| 4,530,917 * | 7/1985 | Berrebi | 502/220 |
| 4,725,569 * | 2/1988 | Tuszynski et al. | 502/168 |
| 4,943,547 | 7/1990 | Seamans et al. | 502/150 |

FOREIGN PATENT DOCUMENTS

| | | | |
|---|---|---|---|
| 0 064 429 | 3/1982 | (EP) | 37/20 |
| 0 130 850 | 2/1984 | (EP) | 37/20 |
| 0 329 499 A1 | 1/1989 | (EP) | 37/20 |
| 0 338 897 A1 | 4/1989 | (EP) | 37/20 |
| 0 466 568 | 1/1992 | (EP) . | |
| 0 842 701 | 5/1998 | (EP) . | |
| 2 476 118 | 2/1980 | (FR) | 45/8 |
| 2 609 650 | 1/1987 | (FR) | 37/20 |
| 2 627 104 | 2/1988 | (FR) | 37/20 |
| 2 758 478 | 1/1997 | (FR) | 37/20 |
| 1 309 457 | 6/1970 | (GB) | 11/74 |

OTHER PUBLICATIONS

French Search Report Dec. 1999.

* cited by examiner

Primary Examiner—Mark L. Bell
Assistant Examiner—Patricia L. Hailey
(74) Attorney, Agent, or Firm—Smith, Gambrell & Russell, LLP

(57) ABSTRACT

The invention relates to a process for the sulphurization of catalysts for the hydrotreating of hydrocarbon feedstocks. According to the invention, a small amount of at least one orthophthalic acid ester is added to the sulphurization agent used to sulphurize the catalyst. The catalysts thus sulphurized prove to be more active than conventionally sulphurized catalysts.

13 Claims, No Drawings

PROCESS FOR SULPHURIZATION OF HYDROTREATING CATALYSTS

FIELD OF THE INVENTION

The present invention relates to the field of the hydrotreating of hydrocarbon feedstocks and has more particularly as subject-matter a process for the sulphurization of the catalysts used for this purpose.

BACKGROUND OF THE INVENTION

The catalysts for the hydrotreating of hydrocarbon feedstocks to which the present invention relates are used under conditions appropriate for converting organosulphur compounds to hydrogen sulphide in the presence of hydrogen, which operation is known as hydrodesulphurization (HDS), and for converting organonitrogen compounds to ammonia in an operation which is known as hydrodenitrogenation (HDN).

These catalysts are generally based on metals from groups VIB and VIII of the Periodic Classification of the Elements, such as molybdenum, tungsten, nickel and cobalt. The most commonly used hydrotreating catalysts are formulated from cobalt-molybdenum (Co—Mo), nickel-molybdenum (Ni—Mo) and nickel-tungsten (Ni—W) systems on porous inorganic supports, such as aluminas, silicas or silicas/aluminas. These catalysts, manufactured industrially in very large tonnages, ate supplied to the user in their oxide forms (for example, cobalt oxides-molybdenum oxide catalysts on alumina, symbolized by the abbreviation: Co—Mo/alumina).

However, these catalysts are active in hydrotreating operations only in the form of metal sulphides. This is why, before being used, they have to be sulphurized.

As regards the activation of hydrotreating catalysts, the sulphurization of these catalysts is an important stage in obtaining their maximum performance with regard to HDS and HDN. As is indicated by the authors of Hydrotreating Catalysis (Catalysis, Vol. 11, 1996, p. 25, edited by J. R. Anderson and M. Boudart), practical experience has shown that the sulphurization procedure can have a significant influence on the activity and stability of the catalyst, and much effort has been devoted to improving the sulphurization procedures.

The most direct method for the sulphurization of a catalyst consists in treating the latter with hydrogen sulphide mixed with hydrogen. This method, which has formed the subject-matter of many patents (U.S. Pat. Nos. 3,016,347, 3,140,994, GB 1,309,457, U.S. Pat. Nos. 3,732,155, 4,098, 682, 4,132,632, 4,172,027, 4,176,087, 4,334,982, FR 2,476, 118), is generally only practised at the laboratory stage, as the use of hydrogen sulphide has major disadvantages which do not allow it to be employed on every industrial site.

The industrial procedures for the sulphurization of the catalysts are generally carried out under hydrogen pressure with liquid feedstocks already comprising sulphur compounds as sulphurizing agents. The method chiefly used in the past by refiners consisted in sulphurizing the catalysts with the sulphur-comprising oil feedstocks, but this technique had significant disadvantages because of the difficulty of converting the sulphur compounds to hydrogen sulphide. To avoid the reduction of the catalysts by the hydrogen, the sulphurizations, initiated at low temperature, had to be taken slowly to high temperature in order to obtain complete sulphurization of the catalysts.

Sulphur-comprising additives have been proposed for improving the sulphurization of the catalysts. The method consists in incorporating a sulphur compound (spiking agent) in a feedstock, such as a naphtha, or in a specific fraction, such as a VGO (vacuum gas oil) or an LGO (light gas oil). U.S. Pat. No. 3,140,994 was the first to claim the use of compounds of different natures which are liquid at ambient temperature: carbon disulphide, thiophene, mercaptans, dialkyl disulphides and diaryl disulphides. organic sulphides, in particular dimethyl sulphide, have also formed the subject-matter of claims. Dimethyl disulphide (DMDS) has been more particularly recommended for the sulphurization of the catalysts and an effective method for sulphurization with dimethyl disulphide is disclosed in Patent EP 64,429.

H. Hallie (Oil and Gas Journal, Dec. 20, 1982, pp 69–74) has reviewed these procedures for sulphurization under hydrogen which are carried out directly in hydrotreating reactors. These various techniques for the sulphurization of catalysts, known as "in situ" techniques, have been compared and studies have shown that sulphurization with a liquid feedstock to which has been added a sulphurizing agent which has the property of decomposing at low temperature (spiked feedstock) is the best sulphurization technique. The technique without an additional sulphurizing agent (nonspiked feedstock) gives a less active sulphurized catalyst. The sulphurizing agent which it is preferred to add to the feedstock is dimethyl disulphide.

Organic polysulphides have also been claimed as sulphurizing agents for the sulphurization of the catalysts. U.S. Pat. No. 4,725,569 discloses a method for the use of organic polysulphides of $RS_xR'$ type (it being possible for R and R' to be identical or different, with x equal to or greater than 3) which consists in impregnating the catalyst at ambient temperature with a solution comprising the polysulphide, in subsequently removing the inert solvent and, finally, in carrying out the sulphurization, under hydrogen, of the charged catalyst in the hydrotreating reactor. In Patent EP 298,111, the polysulphide of $RS_xR'$ type, diluted in a liquid feedstock, is injected during the sulphurization of the catalyst in the presence of hydrogen.

Functionalized mercaptans, such as mercaptocarboxylic acids or esters, dithiols, aminomercaptans and hydroxymercaptans, as well as thiocarboxylic acids or esters, are claimed in Patent EP 289,211 for the sulphurization of the catalysts.

More recently, new techniques for the sulphurization of the catalysts comprising two stages have been developed. In a first stage, known as an "ex situ" stage, the catalyst is preactivated in the absence of hydrogen outside the refinery after having been impregnated with a sulphurizing agent. The complete sulphurization of the catalyst is carried out in the hydrotreating reactor in the presence of hydrogen. The "ex situ" presulphurization relieves the refiner from injecting a sulphurizing agent during the sulphurization of the catalyst under hydrogen. The "ex situ" techniques developed at present use organic polysulphides or sulphur as sulphur-comprising products.

An industrial technique for the presulphurization of catalysts under "ex situ" conditions, based on the use of organic polysulphides of the $RS_xR'$ type (it being possible for R and R' to be identical or different and $x \geq 3$), has formed the subject-matter of Patent EP 130,850. This process consists in impregnating the catalyst, in oxide form, with a solution of organic polysulphides, such as tert-nonyl polysulphides (TPS 37 or TNPS, sold by Elf Atochem), in a hydrocarbon of the white spirit type. This preliminary stage of incorporation of a sulphur compound of a specific nature in the catalyst is supplemented by a heat treatment of the catalyst in the absence of hydrogen at temperatures not exceeding 150° C. This operation has the effect of removing the organic solvent and of ensuring the attachment of the sulphur to the catalyst by means of the organic polysulphides. At this presulphurization stage, the catalyst is stable in air and can be handled without specific precautions. It is supplied in this state to the user who, after charging to the hydrotreating reactor, can bring the sulphurization of the catalyst to completion under hydrogen for the complete conversion of the metals to metal sulphides.

Other organic polysulphide compounds, with different structures, have also been claimed for the presulphurization of the catalysts under "ex situ" conditions. The products recommended in Patents FR 2,627,104 and EP 329,499 have the general formula: R'—$(S_y$—R—$S_x$—R—$S_y)$—R' and are obtained from olefins and sulphur chloride by a series of successive stages which involve a reaction with an organic monohalide, followed by a reaction with an alkaline polysulphide. In Patent EP 338,897, the products claimed are synthesized from olefins and sulphur chloride with an additional reaction with an alkaline mercaptide or an alkaline polysulphide mercaptate.

The development of a technique for the "ex situ" presulphurization of the catalysts using sulphur in suspension in an oil (U.S. Pat. No. 4,943,547) has presented such problems of industrial application that it has been necessary to develop a new process for sulphurization with sulphur which consists in bringing the catalyst into contact with sulphur and an olefin of high boiling point. The catalyst, thus impregnated, is subsequently heat-treated at a temperature of greater than 150° C. and then the sulphurization of the catalyst is brought to completion under hydrogen at temperatures of greater than 200° C.

Very recently, in Patent FR 2,758,478, it has been shown that the joint use of a tertiary mercaptan and another sulphurization agent, such as dimethyl disulphide, for example, makes it possible to obtain hydrotreating catalysts which are more active with regard to the hydrodesulphurization of hydrocarbon feedstocks than catalysts sulphurized in the absence of tertiary mercaptan.

DETAILED DESCRIPTION OF THE INVENTION

The aim of the present invention is to make improvements to the sulphurization of the catalysts and to increase the activity of the catalysts, in particular for the hydrotreating of hydrocarbon feedstocks.

It has now been found, surprisingly, that the joint use of a sulphurization agent and an ester of orthophthalic acid makes it possible to obtain catalysts which are more active with regard to hydrodesulphurization of hydrocarbon feedstocks than the catalysts sulphurized in the absence of this orthophthalic acid ester.

Thus, the present invention relates to a process for the sulphurization of catalysts based on metal oxide(s) comprising a stage of treatment of the catalyst with a sulphurization agent, characterized in that an orthophthalic acid ester is added to the latter.

The present invention applies equally well to techniques for the sulphurization of the catalysts under "in situ" conditions and to those carried out under "ex situ" conditions.

In "in situ" sulphurizations, the sulphur compounds are introduced during the treatment of the catalysts in the presence of hydrogen for the conversion of the metal oxides to metal sulphides. According to the present invention, the orthophthalic acid ester is introduced at the same time as the sulphur compounds which are generally used to generate, in the presence of hydrogen, the hydrogen sulphide which ensures the conversion of the metal oxides to metal sulphides.

In "ex situ" presulphurizations, the sulphur compounds are incorporated in the catalysts before their treatment for the conversion of the metal oxides to metal sulphides. According to the present invention, the orthophthalic acid ester can be incorporated as a mixture with the sulphur compound.

The orthophthalic acid esters according to the present invention correspond to the following general formula:

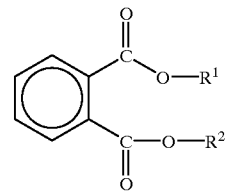

in which the $R^1$ and $R^2$ symbols, which are identical or different, each represent an alkyl (linear or branched), cycloalkyl, aryl, alkylaryl or arylalkyl radical, it being possible for this radical to comprise 1 to 18 carbon atoms and optionally one or more heteroatoms.

The preferred orthophthalic acid esters according to the invention are those in which the $R^1$ and $R^2$ symbols represent identical alkyl radicals comprising from 1 to 8 carbon atoms and, more particularly, dimethyl orthophthalate, diethyl orthophthalate and bis(2-ethylhexyl) orthophthalate, due to their industrial accessibility and their moderate cost.

The sulphurization agents considered in the present invention can be any sulphurization agent known to a person skilled in the art, such as the feedstock to be hydrodesulphurized itself, carbon disulphide, organic sulphides, disulphides or polysulphides, such as di(tert-nonyl) polysulphides and di(tert-butyl) polysulphides, thiophene compounds or sulphur-comprising olefins obtained by heating olefins with sulphur.

The proportion of orthophthalic acid ester which can be used as a mixture with sulphur-comprising compounds of different natures is from 0.05% to 5% by weight. The proportion used will preferably be from 0.1 to 0.5% (1000 to 5000 ppm).

The following examples illustrate the invention without limiting it.

COMPARATIVE EXAMPLE 1
(Sulphurization with Dimethyl Disulphide)

The test was carried out on a pilot unit of Catatest type with 75 ml of a commercial hydrode-sulphurization catalyst composed of cobalt and molybdenum oxides supported on alumina.

Use is made, as sulphurization feedstock, of a gas oil resulting from the atmospheric distillation of crude oil (Gas Oil Straight Run; hereinafter GOSR) to which 2% by weight of dimethyl disulphide had been added.

The sulphurization was carried out under a pressure of 35 bar, an hourly space volume (HSV) of 2 $h^{-1}$: and an $H_2$/hydrocarbon (HC) ratio of 250 Sl/l in the following way:

rise in temperature from 150° C. to 220° C. at the rate of 30° C./h under the sulphurization feedstock;

continuous monitoring of the content of $H_2S$ in the gases exiting from the reactor;

temperature stationary phase at 220° C. maintained until 0.3% by volume of $H_2S$ in the gases is obtained;

rise in temperature to 350° C. at the rate of 30° C./h;

stationary phase of 14 hours at 350° C.;

stopping the sulphurization feedstock and switching over to the test feedstock.

The activity of the sulphurized catalyst was evaluated with a test feedstock also composed of a gas oil resulting from the atmospheric distillation of crude oil but without additive.

The characteristics of the test feedstock (GOSR) are collated in the following Table 1:

TABLE 1

| Type of feedstock | | GOSR |
|---|---|---|
| Relative density, 15° C. | g/cm³ | 0.8741 |
| Nitrogen | ppm | 239 |
| Sulphur | wt. % | 1.1 |
| ASTM D86 | | |
| SP | ° C. | 227.3 |
| 5% vol. | ° C. | 274.5 |
| 10% vol. | ° C. | 292.0 |
| 30% vol. | ° C. | 315.5 |
| 50% vol. | ° C. | 332.0 |
| 70% vol. | ° C. | 348.0 |
| 90% vol. | ° C. | 367.0 |
| 95% vol. | ° C. | 373.0 |
| FP | ° C. | 373.7 |

After the sulphurization stationary phase at 350° C., the test feedstock was injected as replacement for the sulphurization feedstock and the temperature was brought to 360° C., the other conditions (pressure, $H_2$/HC ratio and HSV) remaining identical.

After a stabilization phase, the activity of the catalyst was measured at 360° C. and expressed in terms of relative volume activity with regard to hydrodesulphurization (RVA), this RVA being calculated in the following way:

After each activation with DMDS, with or without additive, the activity constant with regard to DS (k) is calculated from the residual sulphur content in the test feedstock. The RVA is the ratio of this activity constant to that of the reference test (catalyst sulphurized with DMDS), expressed as a percentage, i.e. $100 \times k/k_{ref}$. Thus, the RVA of the catalyst sulphurized with DMDS is 100%.

EXAMPLE 2

The sulphurization feedstock used in Example 1 was replaced by the same gas oil GOSR to which has been added 2% of a mixture composed of DMDS comprising 2000 ppm of diethyl orthophthalate (DEP). The RVA, calculated at 360° C., is listed in Table 2. Only the temperature of 360° C. is considered because it is this which makes it possible to obtain a residual sulphur content in the region of 500 ppm in accordance with the specification for a gas oil.

EXAMPLE 3

Example 1, using DMDS alone as sulphurization agent, was repeated for confirmation. The result is listed in Table 2.

EXAMPLE 4

Example 2, using a DMDS comprising 2000 ppm of DEP as sulphurization agent, was repeated for confirmation. The result is listed in Table 2.

EXAMPLE 5

The sulphurization feedstock according to Example 1 was replaced by the gas oil GOSR to which has been added 2% of DMDS comprising 1000 ppm of DEP.

The result is listed in Table 2.

TABLE 2

| | Results | | | | |
|---|---|---|---|---|---|
| EXAMPLE | 1 | 2 | 3 | 4 | 5 |
| Sulphurization agent | DMDS alone | DMDS + 2000 ppm of DEP | DMDS alone | DMDS + 2000 ppm of DEP | DMDS + 1000 ppm of DEP |
| RVA at 360° C. | 100 | 113 | 100 | 112 | 115 |

Example 2 clearly shows that the joint use of DEP and DMDS during the sulphurization results in a catalyst which is significantly more active than that of Example 1 (sulphurization without orthophthalate).

Example 3 shows the good reproducibility of the method.

Examples 4 and 5 confirm the enhancing effect of the phthalates on the hydrodesulphurizing activity and also show the low proportion which can be used to obtain this effect.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A process for the sulphurization of a metal catalyst comprising treating the catalyst with a sulphurization agent and an orthophthalic acid ester.

2. The process according to claim 1, wherein the orthophthalic acid ester is of the formula:

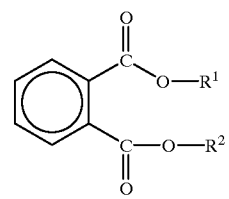

in which the $R^1$ and $R^2$ symbols, which are identical or different, each represent an alkyl, cycloalkyl, aryl, alkylaryl or arylalkyl radical, each radical having from 1 to 18 carbon atoms, and optionally at least one heteroatom.

3. The process according to claim 2 wherein the ester comprises a dialkyl orthophthalate, in which $R^1$ and $R^2$ are the same and each comprise from 1 to 8 carbon atoms.

4. The process according to claim 3, wherein the dialkyl orthophthalate is selected from the group consisting of dimethyl orthophthalate, diethyl orthophthalate, and bis(2-ethylhexyl)orthophthalate.

5. The process according to claim 1, wherein an amount of orthophthalic acid ester used is from 0.05 to 5% with respect to the weight of the sulphurization agent.

6. The process according to claim 5, wherein the amount of orthophthalic ester used is between 0.1 and 0.5%.

7. The process according to claim 1, wherein the sulphurization agent is selected from the group consisting of a feedstock to be hydrodesulphurized, a carbon disulphide, an organic sulphide, an organic disulphide, an organic polysulphide, a thiophene compound, and a sulphur-comprising olefin.

8. The process according to claim 7, wherein the sulphurization agent is dimethyl disulphide.

9. The process according to claim 1, wherein the process is carried out in the presence of hydrogen.

10. The process according to claim 1, wherein a pre-sulpherization step is firstly carried out in the absence of hydrogen.

11. The process according to claim 1, wherein the catalyst comprises a metal oxide deposited in a porous inorganic support, wherein the metal oxide is at least one member selected from the group consisting of molybdenum oxide, tungsten oxide, nickel oxide and cobalt oxide.

12. The process according to claim 11, wherein the catalyst comprises a member selected from the group consisting of a mixture of cobalt and molybdenum oxides; a mixture of nickel and molybdenum oxides; and a mixture of nickel and tungsten oxides, which is supported by a member selected form the group consisting of an alumina, a silica, and a silica/alumina.

13. A method for hydrotreating a hydrocarbon feedstock comprising:

a. treating a metal oxide catalyst with a sulphurization agent, and an orthophthahc acid ester to produce a sulphurized metal catalyst; and b. contacting the hydrocarbon feedstock with the sulphurized metal catalyst to produce a hydrotreated hydrocarbon feedstock.

* * * * *